(12) United States Patent
Ravichandran et al.

(10) Patent No.: US 8,803,088 B1
(45) Date of Patent: Aug. 12, 2014

(54) POLYCRYSTALLINE SINTERED NANO-GRAN ZINC SULFIDE CERAMICS FOR OPTICAL WINDOWS

(71) Applicant: Texas Biochemicals, Inc., College Station, TX (US)

(72) Inventors: Duraiswamy Ravichandran, College Station, TX (US); YiTong Shi, College Station, TX (US)

(73) Assignee: Texas Biochemicals, Inc., College Station, TX (US)

( * ) Notice: Subject to any disclaimer, the term of this patent is extended or adjusted under 35 U.S.C. 154(b) by 0 days.

(21) Appl. No.: 13/904,786

(22) Filed: May 29, 2013

Related U.S. Application Data

(63) Continuation-in-part of application No. 13/371,187, filed on Feb. 10, 2012.

(60) Provisional application No. 61/464,281, filed on Mar. 2, 2011.

(51) Int. Cl.
*G02B 1/00* (2006.01)
*B29D 11/00* (2006.01)

(52) U.S. Cl.
CPC .................................. *B29D 11/0073* (2013.01)
USPC ........................................ 250/330; 250/338.1

(58) Field of Classification Search
CPC ............ G01J 1/0407; G02B 1/12; G02B 1/00
USPC ........................................................ 250/330
See application file for complete search history.

(56) References Cited

U.S. PATENT DOCUMENTS

| | | | | |
|---|---|---|---|---|
| 4,720,362 | A * | 1/1988 | Gentilman et al. | 264/1.21 |
| 4,796,671 | A * | 1/1989 | Furushima et al. | 138/140 |
| 5,108,674 | A * | 4/1992 | Stebbins et al. | 264/621 |
| 2004/0212107 | A1 * | 10/2004 | Hasegawa | 264/1.21 |
| 2011/0174989 | A1 * | 7/2011 | Bayya et al. | 250/472.1 |

* cited by examiner

*Primary Examiner* — Marcus Taningco
(74) *Attorney, Agent, or Firm* — John A. Fortkort; Fortkort & Houston P.C.

(57) ABSTRACT

A method is provided for producing an article which is transparent to visible and infrared radiation. The method includes the steps of forming a green body from a population of nanoparticles; depositing a layer of ZnS powder over the green body, thereby producing a covered green body; and sintering the covered green body, thereby producing a sintered product.

20 Claims, 12 Drawing Sheets

POLYCRYSTALLINE SINTERED NANO-GRAN ZINC SULFIDE CERAMICS FOR OPTICAL WINDOWS

CROSS-REFERENCE TO RELATED APPLICATION

This application claims the benefit of commonly assigned U.S. Ser. No. 13/371,187 (Ravichandran et al.), entitled "Ultra-High Densification of ZnS For Nano-Grain Optical Windows", which was filed on Feb. 10, 2012, and which is incorporated herein by reference in its entirety; which claims the benefit of U.S. provisional application No. 61/463,039 (Ravichandran et al.), entitled "Ultra-High Densification of ZnS For Nano-Grain Optical Windows", which was filed on Feb. 11, 2011, and which is incorporated herein by reference in its entirety.

FIELD OF THE DISCLOSURE

The present application relates generally to the production of materials for infrared optical windows, and more specifically to methods for the densification of nano-grain ZnS ceramics for the production of nano-grain optical windows.

BACKGROUND OF THE DISCLOSURE

The optical windows and domes employed in missile systems for infra-red imaging demand good mechanical stability and high optical transmission in the wavelength range between 0.4 micron and 12 microns. Zinc sulfide, zinc selenide, germanium, gallium arsenide, gallium phosphide, mercury cadmium telluride and cadmium telluride are used in applications such as missile domes which requiring long wavelength infrared transmission capability. Germanium is extremely expensive due to its low availability in nature. The fabrication of zinc sulfide and zinc selenide via CVD routes is problematic due to use of toxic gases, and is not an environmentally benign process. Moreover, the cost of production is very high due to low yield.

Zinc sulfide is a window material for long wave-infrared (LWIR) and semi-active laser dome is multispectral Zinc Sulfide (ZnS), made by chemical vapor deposition. An alternative route to make more erosion-resistant and ultra-high density ZnS could be via hot-press and vacuum sintering route followed by anti-reflective coatings to produce IR windows that are highly erosion-resistant to sand and rain at high altitude flight environments.

A low cost IR window is a mandatory requirement in order to be able to market an affordable vision enhancement system for aircraft, automotive and other high volume applications. The cost of the IR window is a major factor in the viability of offering an IR device for general use. The potential safety benefits to the driving public are enormous. Many lives could be saved and needless destruction of automobiles could be prevented if such a device were available at a reasonable cost. Hence, there is tremendous need exists for the production of a low cost IR window [1].

SUMMARY OF THE DISCLOSURE

Figure 1:
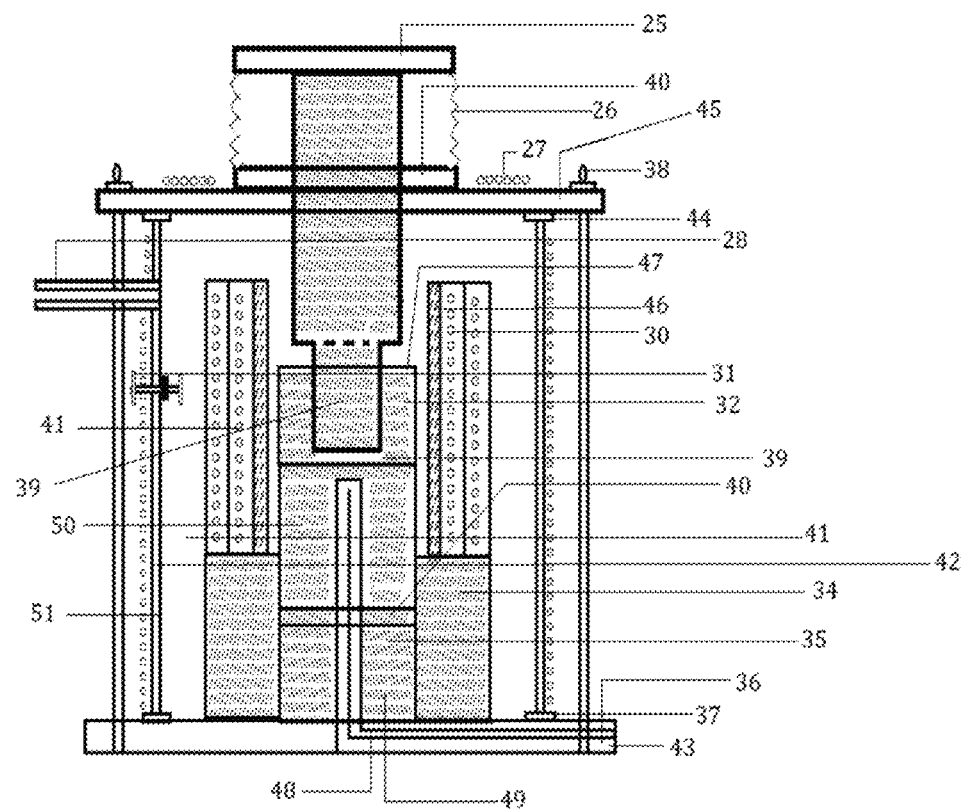
FIG. 1 is an illustration of a molding apparatus for ZnS materials.

In one aspect, a method is provided for producing an article which is transparent to infrared radiation. The method includes the steps of forming a green body from a population of nanoparticles; depositing a layer of ZnS powder over the green body, thereby producing a covered green body; and sintering the covered green body, thereby producing a sintered product.

DETAILED DESCRIPTION

Systems and methodologies for making monodispersed ZnS nanoparticles and articles therefrom have previously been described in commonly assigned U.S. Ser. No. 13/407,223 (Ravichandran et al.), entitled "MONODISPERSED AND SPHERICAL ZNS FOR NANO-GRAIN OPTICAL WINDOWS", now U.S. Pat. No. 8,426,817, which is hereby incorporated herein by reference in its entirety.

ZnS windows were produced by hot pressing of ceramic powders years ago by Kodak and others [1]. The development of a chemical vapor deposition (CVD) process for fabricating ZnS windows largely replaced the prior method of making ZnS windows for military applications where cost was not an important consideration [2]. ZnS made via CVD can be fabricated in larger, flat or curved geometries to conform to the shape of aircraft. However, there is no improvement in the mechanical properties of the windows fabricated through the CVD process. In fact, when ZnS made by CVD is annealed, it becomes more transmissive in the optically visible region, but the ZnS also becomes much softer. It is believed that the removal of the high temperature (hexagonal) wurtzite phase of ZnS by the heat treatment is responsible for the increase in IR transmission, and that the growth of large grains cause the material to soften. Reference 2 gives complete description on ZnS formation by hot pressing and by CVD.

Fully dense, polycrystalline ZnS, as deposited or grown, is orange in color and has very little transmittance in the visible spectrum due to scattering effects. This orange colored, optical grade, CVD processed zinc sulfide is transparent over the range of about 8 to 12 microns. When subjected to a hot isostatic treatment (a treatment at an elevated pressure and temperature), the zinc sulfide becomes transparent both in the visible and infra-red portion of the electromagnetic spectrum and transparent over the range 0.5 to 12 microns.

This treatment, however, has a significant drawback. The Hot-Isostatic Pressing (HIPping) of the zinc sulfide material causes grain growth in the material. An increase in the grain size of the zinc sulfide provides a concomitant reduction in the properties of mechanical strength of the material. That is, although HIPping increases the optical transmission of the material, HIPping also reduces the strength of the material. Although HIPping treated zinc sulfide material is suitable for many applications, it is not desirable for applications in optical windows and domes for use in missile systems. In these applications, the material should possess high mechanical strength and high optical transmission in the visible and infra-red region of the electromagnetic spectrum. In addition to ZnS, other materials [4, 5, 6] have been explored for application in the optical windows and domes employed in missile systems for infra-red imaging.

FIG. 1 shows a prior art molding apparatus for ZnS. The molding apparatus [7] comprises a base 37, a silicone gasket 36, a block 35, a thermal insulator 40, a molding cylinder 32, and a molding plunger 39. The molding plunger 39 has a head which is adapted to be attached to a prime mover (not shown), such as the piston of a hydraulic press to move the plunger 39 vertically into and out of molding cylinder 32 and thereby press the zinc sulfide powder into the solid unit shown at 39. The head 25 is attached to aligning ring 40 by metal bellows 26, thereby assuring a vacuum seal around the upper portion of the plunger 39. A cylinder 29 encloses the molding cylinder 32 and plunger 39 and is supported on block 34. A heating unit 30 comprising a refractory casing is positioned around cylinder 29 and is also supported on block 34 and contains electric heating coils 41, the terminals for which are shown at 31. A cylinder 42 is positioned concentrically in respect to cylinder 29 and forms a vacuum chamber 41, the ends of which are closed by gaskets 43 and 44 and plates 37 and 45. Cooling coils 27 are positioned in contact with the outer surface of cylinder 46. A conduit 47 connects the vacuum chamber 41 to a suitable vacuum system (not shown). The assembly is further secured by the coaction of top plate 45 and threaded rods 38 and base plate 37. The temperature is measured by either one or by both of thermocouples 47 and 48 which are suitably located in channels respectively positioned adjacent the molding position.

The blocks 49, 50 and cylinder 32 may be made of molybdenum, molybdenum alloy, Nichrome or stainless steel. The preferred operation of the device is as follows: Zinc sulfide powder is placed in the molding cylinder 32 beneath plunger 39 and the apparatus is assembled as shown in FIG. 1. The zinc sulfide is first cold pressed. A pressure of 10,000 pounds per square inch is exerted by the plunger 39 on the zinc sulfide powder for a few minutes to compact the powder into a firm compact. The plunger is then removed and any excess or loose powder is removed by the operator.

Systems and methods are disclosed herein which may be utilized to obtain ZnS windows with good mechanical strength and good IR transmission. The zinc sulphide nanoparticles used in these systems and methodologies preferably have a narrow size distribution in the range of 5-50 nm, 50-100 nm, 100-200 nm, or 200-450 nm. These nanoparticles are preferably substantially monodispersed, spherical or cubic shaped particles with high purity (e.g., 99.99%), and may be fabricated into high-optical quality IR windows. The forming process used in these systems and methodologies to form a green body may comprise uniaxial pressing, cold isostatic pressing, gel-casting or slip casting. This is preferably followed by sintering the green body to produce a transparent polycrystalline ceramic that can transmit visible to infra-red wavelengths. The sintering process preferably comprises vacuum sintering in which the green body is buried with sacrificial ZnS fine powders to prevent any sulphur loss from the green body. Other sintering methods may also be utilized, including controlled atmosphere sintering, pulsed-electric current sintering, hot-pressing, plasma sintering, microwave sintering, laser sintering and radio-frequency sintering.

In the methodologies disclosed herein, the forming materials may include zinc sulphide, $CaLa_2S_4$, CaS, SrS, PbS, $CaF_2$, $SrF_2$, $ZnF_2$, $Ga_2S_3$, composites of ($ZnS$—$Ga_2S_3$) zinc sulphide-gallium sulphide (2-40 wt %), zinc sulphide-gallium phosphide (2-35 wt %), zinc selenide, gallium phosphide, spinel ($MgAl_2O_4$, Magnesium Aluminum Oxide) and aluminum oxynitride (ALON) nano-particles. Preferably, the general methodology comprises: (a) green body formation via uniaxial pressing, cold-isostatic pressing, gel-casting or slip-casting, followed by (b) consolidation via vacuum-sintering with sacrificial ZnS fine powders where in the green body is buried in ZnS fine powders to prevent sulphur loss during vacuum sintering, controlled atmosphere sintering, hot-pressing in a graphite furnace where in the green body is wrapped in graphite foil, pulsed-electric current sintering, plasma sintering, microwave sintering, laser sintering, or radio-frequency sintering, and (c) subsequent hot-isostatic pressing to reduce the trace level pores to improve clarity. It will be appreciated that any combination of the foregoing possibilities may be utilized.

Figure 2:
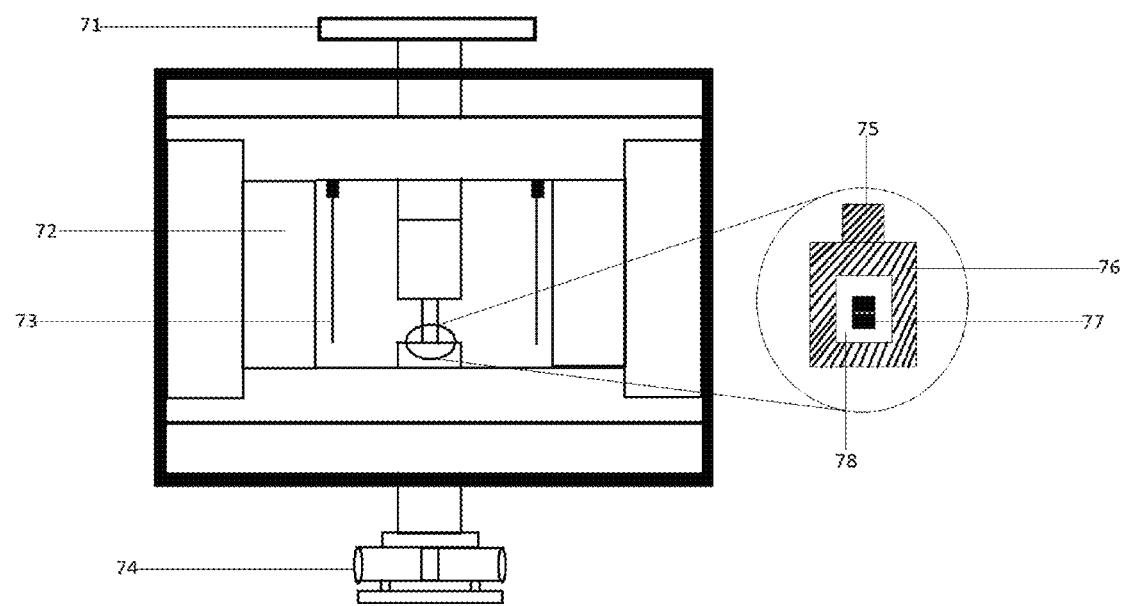
FIG. 2 is an illustration of a hot press designed for high temperature and high pressure consolidation of ceramic nanopowders.

Method 1 (Hot-Press): The hot press is designed for high temperature, high pressure consolidation of ceramic nanopowders materials (see FIG. 2). The hot press utilizes operating temperatures up to a maximum of 2000° C., with uniaxial loads anywhere from 10 or 25 tons. The hot-press is capable of densifying all known ceramic materials [7-13].

Before performing the hot-press of the nanopowder, cold-isostatic pressing of the nanopowder is done between 10,000-60,000 psi, and preferably between 25,000-40,000 psi. Cold-Isostatic Pressing (CIP) is a materials forming processing technique in which high pressure is applied to ceramic powder in a sealed elastomer container shaped for the application. The powder is converted from a loose aggregate into a partially dense compact that has sufficient green strength to permit careful handling and transfer to the next sintering process operation.

The powders were consolidated in a hot press with graphitic interior under Ar (99.99% purity) or vacuum atmosphere. A graphite die fixture is used with a graphite foil or molybdenum foil or platinum foil as a liner. The graphite die is lined with graphite foil or molybdenum foil or platinum foil, and foil disks are cut to fit at the ends of the graphite punches. This is done to avoid contamination of the graphite particles from the die set to the sintered sample. A flexible graphite foil is an excellent material for many hot pressing applications. The graphite foils used are highly pure, pliable graphite manufactured without binders, resins or additives to change the inherent properties of the graphite material, and are thermally stable, anisotropic, chemically inert, and impermeable to many molten materials and liquids. The nanopowders are heated at initially at about 2-5° C./min to 200° C. to drive out any moisture in the nanopowder, and are then heated to 700-1000° C. and held in that temperature range for 5-10 hrs. A uniaxial die pressure of 45-250 MPa is applied at about 1000° C. During the entire run, a vacuum better than $10^{-3}$-$10^{-7}$ Torr is maintained. After sintering, the pellets are ground to 2 mm thickness and double side polished for FT-IR measurements.

The hot press system has a complete vacuum chamber, mechanical vacuum pump, high vacuum pumping systems, graphite hot zone, power supply, hydraulic press and frame, load cells and a programmable control system.

Figure 3:
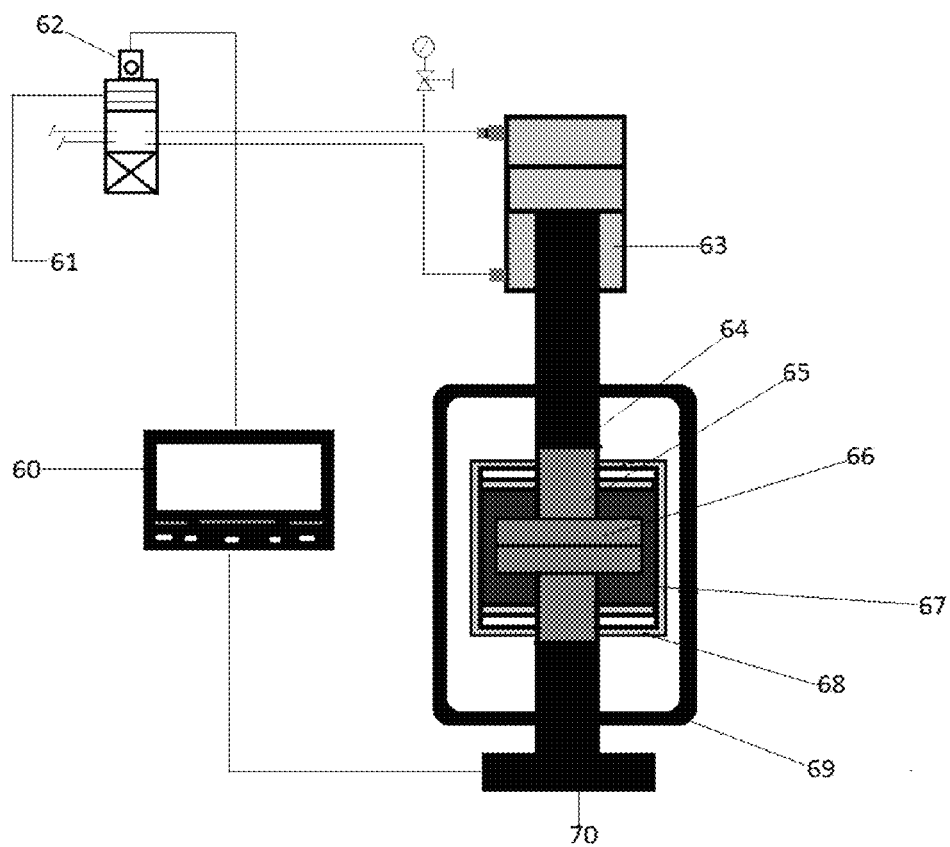
FIG. 3 is an illustration of a graphite fixture for use in hot pressing.

Initially the nanopowder is placed in the graphite fixture 76 in FIG. 3 and the top plunger 75 is lined with a high purity graphite foil. Two foil disks are cut to fit at the ends of the graphite punches. One of the punches 77 is shown. The top plunger is carefully pushed into the graphite fixture 76.

Figure 4:
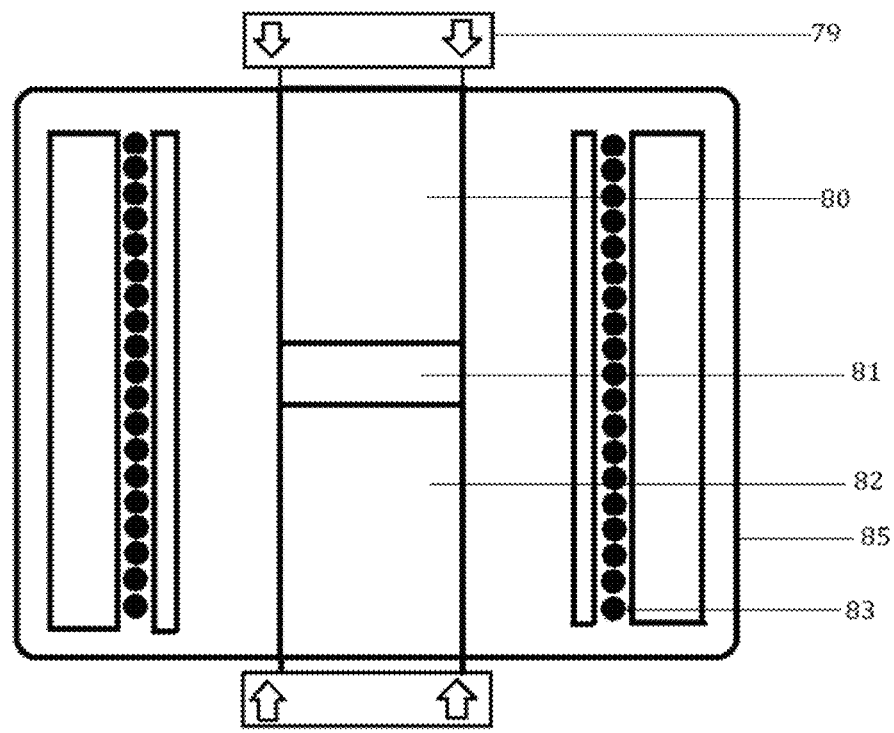
FIG. 4 is an illustration of the furnace chamber of a hot press.
Figure 5:
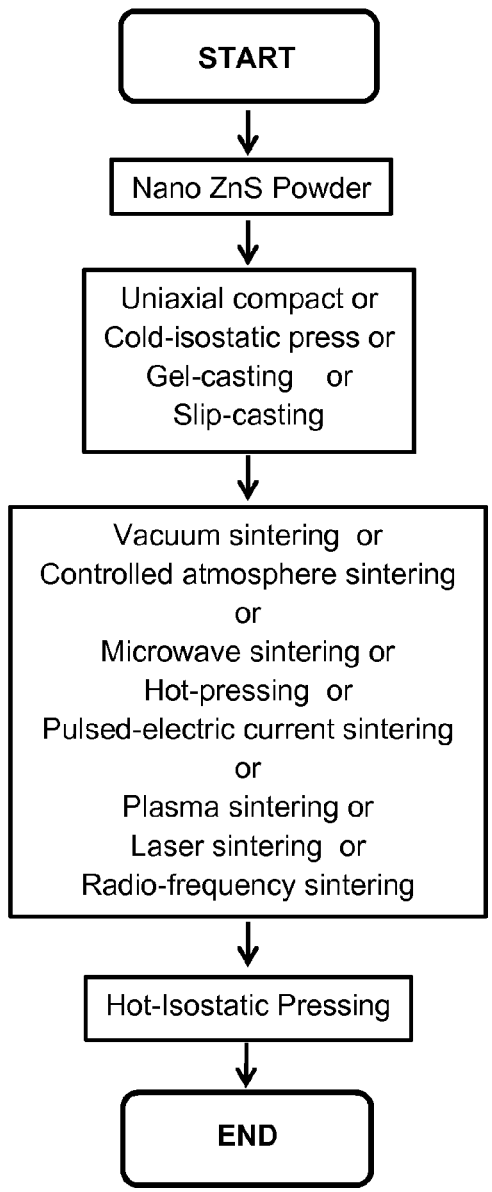
FIG. 5 is a flow chart depicting an embodiment of a method for producing sintered articles in accordance with the teachings herein.

The assembly is ready to be hot-pressed. The whole assembly is placed in the furnace chamber 69, including the punch and die set assembly 66, the top punch 65 in FIG. 2. The entire chamber is then heated up with furnace heating elements 67, and the heat is maintained in the heat chamber with high accuracy of ±1° C. by the heat shields 68. The load is applied through a load cell 70 controlled by a pressure controller via a hydraulic cylinder 63 through a servo amplifier 62 and servo valve 61. In FIG. 4, the heating elements 83 are shown to uniformly transfer heat to the nanopowder, with top punch 80, the sample 81 and bottom punch 82 inside the furnace chamber 85. The process flow chart is given in FIG. 5.

Before subjecting the powder to the green body forming process, the sulphide nano-powders are analyzed with high resolution powder X-ray diffraction for phase purity of the nano zinc sulphide powder. The phase composition and phase structure of the as-prepared products were analyzed by X-ray diffraction (XRD) using a Bruker D8 Advance Power X-ray Diffractometer (Cu $K_\alpha$ $\lambda$=0.15418 nm) operating at 40 kV/40 mA, with a graphite reflected beam monochromator and variable divergence slits. The scanning rate used was 0.02° $s^{-1}$. The morphologies of the products were analyzed using Quanta FE-600 scanning electron microscopes (SEM) in analysis of ZnS nanoparticle samples. Initially the samples were dispersed in ethanol. A small drop was placed using a micro-pipette on an Aluminum stub with a carbon tape on it that has a piece of aluminum foil on the top. To eliminate charging the samples were sputter coated either with gold or Pt/Pd under vacuum conditions with Argon gas (typically ZnS charges with high energy electron beam excitation).

Figure 6:
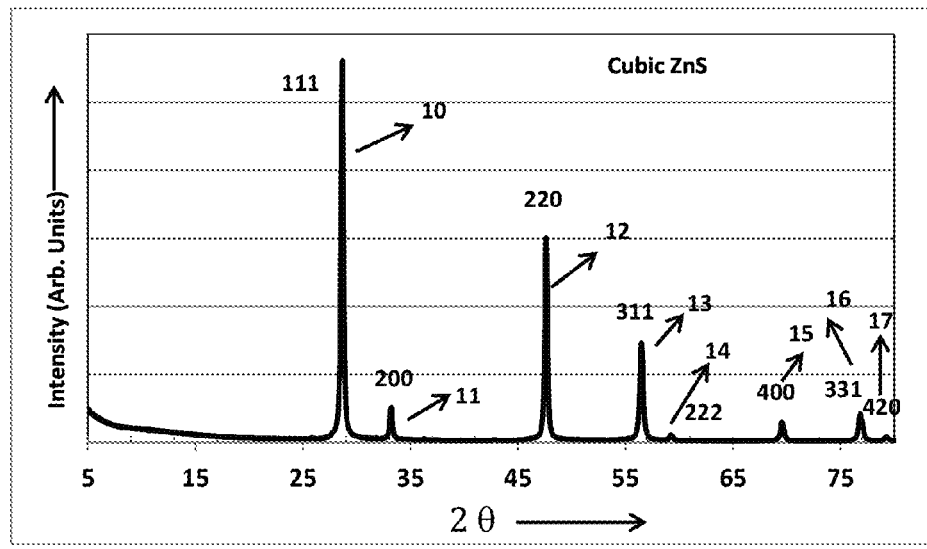
FIG. 6 is a powder x-ray diffraction of a zinc sulphide nanopowder sample made in accordance with a methodology disclosed herein.

FIG. 6 shows a high resolution powder X-ray diffraction of ultra-high purity (99.99%) cubic zinc sulphide nanopowder. The diffraction peak 10 corresponds to the (1, 1, 1) plane of the cubic crystalline ZnS material, and similarly, the peak 11 corresponds to the (2, 0, 0) plane, the peak 12 corresponds to the (2, 2, 0) plane, the peak 13 corresponds to the (3,1,1) plane, the peak 14 corresponds to the (2,2,2) plane, the peak 15 corresponds to the (4,0,0) plane, peak 16 corresponds to the (3,3,1) plane and peak 17 corresponds to the (4,2,0) plane of the cubic crystalline ZnS material.

The powder is then subjected to forming process via (a) uniaxial pressing, cold isostatic pressing, gel casting or slip casting method. This is followed by consolidation of the green body via vacuum sintering with sacrificial ZnS fine powders where in the green body is buried in ZnS fine powders to prevent sulphur loss during vacuum sintering, controlled atmosphere sintering, hot-pressing (in a graphite furnace where in the green body is wrapped in a graphite foil or molybdenum foil or platinum foil), pulsed-electric current sintering, plasma sintering, microwave sintering, laser sintering, or radio-frequency sintering, and (c) subsequent hot-isostatic pressing to reduce the trace level pores to improve clarity, or any combination thereof.

The ZnS ceramic specimens are preferably polished in three different steps such as grinding, polishing, and fine polishing. Initial grinding removes any saw marks and cleans the specimen surface. This is accomplished manually on a dry 240 grit $Si_3N_4$ sand paper. The $Si_3N_4$ abrasive particles are bonded to the paper for fast stock removal. The polishing and fine polishing removes the artifacts of grinding. During polishing, a COTLAP™ Polish Cloth was used with 3 μm diamond powder. A mirror finish was achieved using a RAYON™ Velvet polish cloth with 1 μm diamond on it. In both polishing and fine polishing, the diamond abrasive particles were suspended in oil and thus were able to roll or slide across the cloth in order to obtain mirror polished sintered body.

Figure 7:
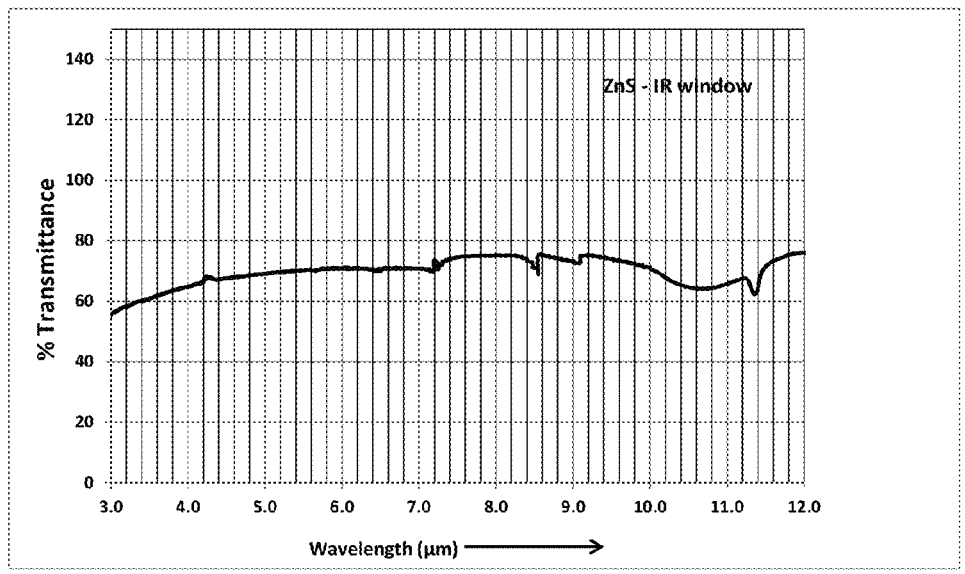
FIG. 7 is an FTIR spectrum of a ZnS article made in accordance with the teachings herein.
Figure 8:
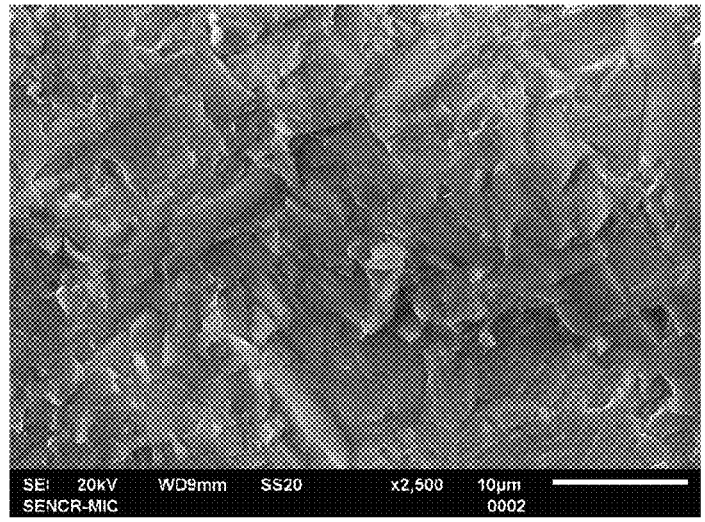
FIG. 8 is an SEM image of a sintered product made in accordance with the teachings herein.
Figure 9:
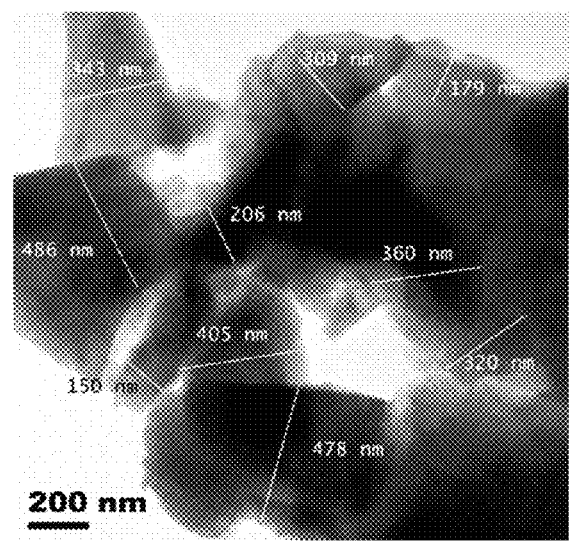
FIG. 9 is a TEM image of a sintered product made in accordance with the teachings herein.

The mirror polished ZnS polycrystalline ceramic materials were used to collect the percentage IR transmittance. Fourier transform infrared (FT-IR) spectra were recorded on a Nicolet-6700 Fourier transform infrared spectrometer. FIG. 7 shows the percentage of IR transmittance of the ZnS polycrystalline ceramic samples with 72% transmittance. FIG. 8 shows SEM images of the sintered product. The SEM images indicate high density samples without any pores or voids in the samples. FIG. 9 shows TEM images of the sintered product. The grain size appears to be in the nanometer size range. The grain size varies from 150-500 nm. The knoop hardness for the nano-grained samples were measured and found to be in the range of 400-520 kg/$mm^2$.

Method: 2 (Vacuum Sintering)

Figure 10:
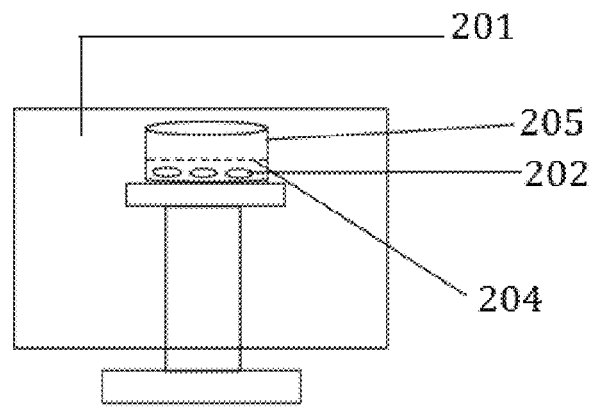
FIG. 10 is an illustration of a vacuum furnace which may be utilized to produce sintered articles in accordance with the teachings herein.
Figure 11:
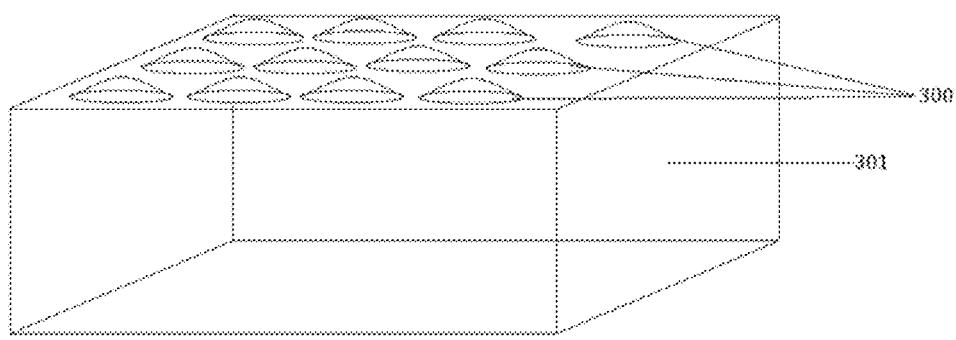
FIG. 11 is an illustration of the arrangement of several CIPed dome shaped objects on a ceramic crucible.

The vacuum furnaces normally come with graphite, tungsten mesh, molybdenum mesh, or silicon carbide hot zones to meet specific process requirements. Atmospheres ranging from high vacuum to inert to reducing atmosphere were used. Several of the CIPed samples were prepared similar to Method 1 and were sintered cost-effectively all together in a vacuum furnace. FIG. 10 show a vacuum furnace with vacuum chamber 201, although a hot-press may also be used as a vacuum furnace without the pressure. A crucible 205 containing several samples 202 embedded with commercial ZnS (204) powder (with a size ranging from 1-5 microns, and preferably 3-5 microns) was placed in a vacuum chamber 201 and heated in a controlled manner with vacuum, preferably within the range of $1\times10^{-3}$ to $1\times10^{-7}$ torr. In a similar manner, several CIPed dome shaped object (300) can be placed on a ceramic crucible of larger area (301) and can be sintered in a vacuum furnace as shown in FIG. 11.

Figure 12:
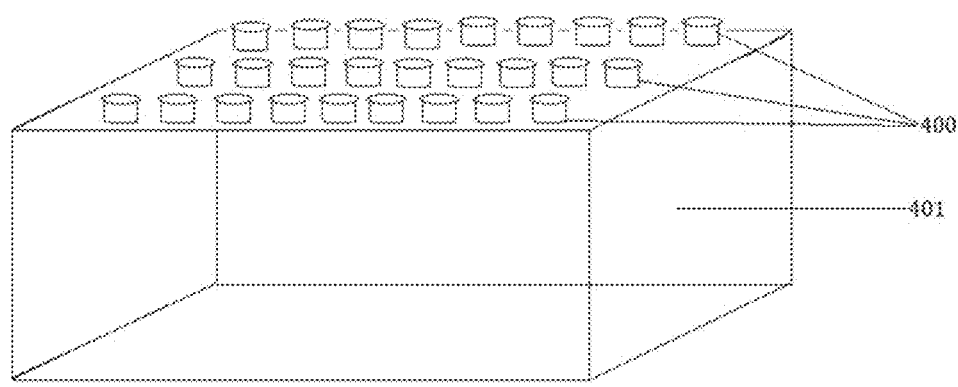
FIG. 12 is an illustration of the arrangement of several flat objects on a ceramic crucible.

The CIPed domes (300) may be arranged as close as possible without touching each other on a ceramic platform (301) or a quartz platform and may be inserted into a vacuum furnace. By this method, one can sinter several samples in a vacuum furnace simultaneously. One can also sinter flat objects lined up as close as possible as shown in FIG. 12. The flat optical ceramic green body 400 can be sintered cost-effectively in a vacuum furnace by placing them on a ceramic or quartz platform 401.

The temperature range of sintering is preferably within the range of 700-1020° C., and more preferably within the range of 800-1010° C., and the samples are held at this temperature for 5-10 hr. The samples are buried with commercially available ZnS powder which is preferably in the 2-5 μm range, and more preferably in the 3-5 μm range. This prevents the sulphur loss from the CIPed compact during sintering, and the exact stoichiometric ratio of Zn:S (1:1) can be maintained effectively.

The pressure is maintained within the range of $1\times10^{-3}$ torr to $1\times10^{-7}$ torr. The sintered compact is further Hot-Isostatically pressed (HIP). The HIP process subjects a component to both elevated temperature and isostatic gas pressure in a high pressure containment vessel. The pressurizing gas most widely used is argon. An inert gas is used, so that the material does not chemically react. The chamber is heated, causing the pressure inside the vessel to increase. Many systems use associated gas pumping to achieve the necessary pressure level. Pressure is applied to the material from all directions (hence the term "isostatic"). The HIP is performed at a temperature within the range of 800-1100° C., and more preferably, at a temperature within the range of 850-1080° C. The samples were cut and polished using several grade diamond pastes.

The sintered and annealed ceramic windows disclosed herein may be supplemented with coatings to further enhance their properties and to provide increased protection. An antireflective coating, for example, may be applied to minimize the reflection of infrared radiation and thereby cause more of the radiation to pass through the window. Examples of coating materials for this purpose are low refractive index materials, particularly yttria, silica, magnesium fluoride, calcium fluoride, zinc fluoride, zinc selenide, and Hafnium oxide. Multiple antireflective coatings may also be used. In some applications, a coating that will transmit visible radiation in addition to the infrared radiation may be desired. Examples of coating materials for this purpose are leaded glass and Zinc Selenide. Alternatively or in addition, coatings for scratch or erosion resistance may be applied, particularly for enhanced protection against rain, blowing sand, and particle impacts in general. Materials with a high damage threshold velocity, such as gallium phosphide, sapphire, spinel, and aluminum oxynitride (ALON) may also be utilized.

It will be appreciated that the technique of densification of nano-size crystals of ZnS through green body forming by one these steps may include uniaxial pressing, cold isostatic pressing, gel casting or a slip casting method. This is followed by consolidation of the green body via vacuum sintering with sacrificial ZnS fine powders (wherein the green body is buried in ZnS fine powders to prevent sulphur loss during vacuum sintering), controlled atmosphere sintering, hot-pressing in a graphite furnace (wherein the green body is wrapped in a graphite foil), pulsed-electric current sintering, plasma sintering, microwave sintering, laser sintering, or radio-frequency sintering, and subsequent hot-isostatic pressing to reduce the trace level pores to improve clarity and to achieve a theoretical density of 4.10 gm/cc, or any combination of the foregoing. This methodology may be utilized to produce cost-effective IR windows that can sustain sand and rain erosion due to smaller grain in the range 150-500 nm grain size, and may result in high mechanical strength and high transmission. The ZnS materials fabricated by these routes may be utilized in the windows and domes employed in missile systems and for infra-red imaging. This approach may be applied to the other materials listed above, and these materials may be used in various applications, especially those in which both mechanical strength and optical transmission are important and stability against hostile environments is required.

The following is a listing of the references referred to herein:

REFERENCES

1. Harris, Norman H, Dougherty, Thomas K. U.S. Pat. No. 5,575,959 Nov. 19, 1996.
2. Harris, Daniel C., "Development of Hot-Pressed and Chemical-Vapor-Deposited Zinc Sulfide and Zinc Selenide in the United States for Optical Windows", (2007), Proceedings of SPIE, XP002515445, vol. 6545, No. 1, pp. 654502-1-654502-27.
3. J. A. Savage, Infrared Optical Materials and Their Antireflection Coatings, Adam Hilger LTD., Bristol and Boston (1985), pp. 95-111.
4. J. Wahl, R. W. Tustison, T. Y. Wong, C. B. Willingham, U.S. Pat. No. 5,281,465, 1994.
5. J. Wahl, R. W. Tustison, T. Y. Wong, U.S. Pat. No. 5,324,353, 1994.
6. R. Korenstein, P. K. Hogan, J. S. McCloy, C. B. Willingham, U.S. Pat. No. 7,790,072, 2010.
7. E. Carnall, JR., P. B. Mauer, W. F. Parsons and D. W. Roy, U.S. Pat. No. 3,131,025, 1964.
8. K. Shibata, U.S. Pat. No. 6,111,689, Aug. 29, 2000.
9. C. B. Willingham, J. Pappis, U.S. Pat. No. 5,126,081, Jun. 30, 1992.
10. N. H. Harris, T. K. Dougherty, U.S. Pat. No. 5,575,959, Nov. 19, 1996.
11. Z. Shizen, M. A. Hongli, R. Jean, M. C. Odile, A. Jean-Luc, L. Jacques, Z. Xianghua, OPTOELECTRONICS AND ADVANCED MATERIALS, Vol. 1, No. 12, December 2007, p. 667-671.
12. Y. D. Kim, K. Sonezaki, H. Maeda, A. Kato. *Journal of Materials Science,* 10-1997, Volume 32, Issue 19, pp 5101-5106.
13. C. Chlique, G. Delaizir, O. Merdrignac-Conanec, C. Roucau, M. Dollé, P. Rozier, V. Bouquet, X. H. Zhang, Optical Materials, Volume 33, Issue 5, March 2011, Pages 706-712.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for producing an article which is transparent to visible and infrared radiation, comprising:
    forming a green body from a population of nanoparticles;
    depositing a layer of ZnS powder over the green body, thereby producing a covered green body; and
    sintering the covered green body, thereby producing a sintered product.

2. The method of claim 1, further comprising subjecting the sintered product to hot isostatic pressing.

3. The method of claim 2, wherein the hot isostatic pressing improves the optical clarity of the sintered product.

4. The method of claim 2, wherein the hot isostatic pressing reduces trace level pores in the sintered product.

5. The method of claim 1, wherein the green body is formed by a process is selected from the group consisting of uniaxial pressing, cold isostatic pressing, gel casting and slip casting.

6. The method of claim 5, wherein the green body is formed by cold isostatic pressing at a pressure within the range of about 10,000 to about 60,000 psi.

7. The method of claim 5, wherein the green body is formed by cold isostatic pressing at a pressure within the range of about 20,000 to about 50,000 psi.

8. The method of claim 5, wherein the green body is formed by cold isostatic pressing at a pressure within the range of about 25,000 to about 40,000 psi.

9. The method of claim 1, wherein sintering the green body involves subjecting the green body to a sintering process selected from the group consisting of vacuum sintering, controlled atmospheric sintering, pulsed electric current sintering, hot pressing, plasma sintering, miocrowave sintering, laser sintering and radio frequency sintering.

10. The method of claim 1, wherein sintering the green body involves subjecting the green body to vacuum sintering.

11. The method of claim 1, wherein sintering the green body induces consolidation of the green body.

12. The method of claim 11, wherein the sintering is conducted in an inert atmosphere.

13. The method of claim 11, wherein the sintering is conducted in a vacuum.

14. The method of claim 11, wherein the sintering is conducted in a hot press with a graphitic interior.

15. The method of claim 1, wherein the nanoparticles are ZnS nanoparticles.

16. The method of claim 1, wherein the nanoparticles have a purity of at least 99.5%.

17. The method of claim 1, wherein the nanoparticles have a purity of at least 99.99%.

18. The method of claim 1, wherein the nanoparticles are monodispersed or spherical or cubic shaped nanoparticles, and wherein the population of nanoparticles has a population variance of less than 10% in at least one parameter selected from the group consisting of diameter and maximum dimension.

19. The method of claim 1, wherein depositing a layer of ZnS powder over the green body includes burying the green body in ZnS powder.

20. The method of claim 1, wherein the covered green body is disposed on a substrate during sintering, and further comprising:

removing the sintered product from the substrate as a self-supporting mass that is transparent to visible and in the infrared radiation.

* * * * *